United States Patent
McRae

(10) Patent No.: US 9,094,633 B2
(45) Date of Patent: Jul. 28, 2015

(54) SYSTEM, METHOD AND APPARATUS FOR RESPONDING TO DEVICE ATTACHMENT

(71) Applicant: Matthew B. McRae, Laguna Beach, CA (US)

(72) Inventor: Matthew B. McRae, Laguna Beach, CA (US)

(73) Assignee: Vizio, Inc., Irvine, CA (US)

( * ) Notice: Subject to any disclaimer, the term of this patent is extended or adjusted under 35 U.S.C. 154(b) by 0 days.

(21) Appl. No.: 13/888,554

(22) Filed: May 7, 2013

(65) Prior Publication Data

US 2013/0250175 A1 Sep. 26, 2013

Related U.S. Application Data

(63) Continuation of application No. 12/512,300, filed on Jul. 30, 2009, now Pat. No. 8,438,318.

(51) Int. Cl.
| | |
|---|---|
| G06F 3/00 | (2006.01) |
| G06F 13/42 | (2006.01) |
| H04N 5/44 | (2011.01) |
| H04N 21/41 | (2011.01) |
| H04N 21/4363 | (2011.01) |
| H04N 21/442 | (2011.01) |
| H04N 21/61 | (2011.01) |
| H04N 21/81 | (2011.01) |

(52) U.S. Cl.
CPC ............ *H04N 5/44* (2013.01); *H04N 21/4113* (2013.01); *H04N 21/4117* (2013.01); *H04N 21/4126* (2013.01); *H04N 21/43635* (2013.01); *H04N 21/43637* (2013.01); *H04N 21/44227* (2013.01); *H04N 21/6125* (2013.01); *H04N 21/818* (2013.01)

(58) Field of Classification Search
CPC ............... H04L 9/00; H04L 9/06; H04L 9/08; H04L 63/00
USPC .................. 710/15, 17, 19, 21, 105
See application file for complete search history.

(56) References Cited

U.S. PATENT DOCUMENTS

| | | | |
|---|---|---|---|
| 7,551,730 | B2 | 6/2009 | Li et al. |
| 7,623,635 | B2 | 11/2009 | Cool |
| 8,013,938 | B2 | 9/2011 | Shyu |
| 8,209,717 | B2 | 6/2012 | Pina |
| 2006/0259942 | A1 | 11/2006 | Toyama et al. |
| 2007/0060054 | A1 | 3/2007 | Romesburg |
| 2009/0086105 | A1* | 4/2009 | Onomatsu ............ 348/706 |
| 2010/0086279 | A1* | 4/2010 | Harris ............ 386/66 |
| 2010/0099410 | A1* | 4/2010 | Sweeney et al. ........ 455/435.1 |
| 2010/0112990 | A1* | 5/2010 | Dingler et al. ......... 455/414.2 |
| 2010/0128859 | A1 | 5/2010 | Gonzales |
| 2010/0277597 | A1* | 11/2010 | Vaysburg et al. ......... 348/207.1 |
| 2010/0325554 | A1* | 12/2010 | Lee ............... 715/738 |
| 2011/0103561 | A1* | 5/2011 | Casey et al. .......... 379/93.02 |
| 2011/0116615 | A1* | 5/2011 | Holtel et al. .......... 379/201.02 |
| 2011/0136541 | A1 | 6/2011 | Chang et al. |
| 2011/0222493 | A1* | 9/2011 | Mangold et al. ........... 370/329 |
| 2013/0023295 | A1* | 1/2013 | Kasslin et al. .......... 455/501 |
| 2013/0080663 | A1* | 3/2013 | Rabii et al. ............ 710/16 |
| 2013/0139197 | A1* | 5/2013 | Belz et al. ............ 725/25 |

* cited by examiner

*Primary Examiner* — Idriss N Alrobaye
*Assistant Examiner* — Getente A Yimer
(74) *Attorney, Agent, or Firm* — Law Office of Scott C. Harris, Inc.

(57) ABSTRACT

A television with at least one connection, either wired or wireless. Detection of an active device connected to the connection results in proper software and hardware configuration of the television to properly communicate with the device and provide, for example, proper user interface support and access to the device.

26 Claims, 8 Drawing Sheets

SYSTEM, METHOD AND APPARATUS FOR RESPONDING TO DEVICE ATTACHMENT

CROSS-REFERENCE OF RELATED APPLICATION

This application is a continuation application of U.S. Ser. No. 12/512,300 filed Jul. 30, 2009, now U.S. Pat. No. 8,438,318 issued May 7, 2013, the disclosure of which is herewith incorporated by reference in their entirety.

FIELD OF THE INVENTION

This invention relates to the field of display devices and more particularly to a system for detecting the attachment of a device to a display device and taking appropriate action.

BACKGROUND OF THE INVENTION

Television devices such as LCD or Plasma televisions are becoming more sophisticated each year. Already, most have a processor and memory and a remote control as an input device. Soon, many television devices will have Internet connections and mass storage devices (e.g., disk drives). The Internet connection and storage will be used for many purposes, including the download and storage of content (e.g., movies). The television devices have or will have input ports or other types of connections, either wired or wireless for the connection of devices such as phones, cameras, storage devices, printers, music players, etc.

There are many reasons for connecting such devices to a television device such as, providing an Internet connection (e.g., for content download), providing enhanced caller-id and speaker-phone capabilities to a cell phone, playing content that is stored on the device, printing part of an electronic program guide (EPG) that is stored in the television devices, uploading content such as fonts, patterns, etc., to the television devices, providing videophone capabilities to the television devices, etc.

When a device is connected to existing television devices, there is no reaction. For example, if a cell phone connected to a USB cable is connected into a USB port of the television device, the television device takes no action and it is difficult to perform any useful task with the cell phone and television device combination.

What is needed is a predictable system that provides detection and classification of a device when it is attached to a television device and, responsive to the attachment, activation of corresponding drivers/applets/applications.

SUMMARY

The present invention includes a television with at least one input mechanism, either wired or wireless. Detection of an active connection of a device to an input mechanism results in proper configuration of the television to properly communicate with the device and provide, for example, proper user interface support.

In one embodiment, system for detecting a connection of a device to a television is disclosed including a display panel integrated into the television with a processing element interfaced to the display panel and at least one connection to the television, each of the connections interfaced to the processing element. A device is connected to the television through one of the at least one connections and software running on the processing element recognizes activation of the device and, responsive to the activation of the device, configures the television to operate with the device.

In another embodiment, a method of detecting a connection of a device to a television is disclosed including detecting of the device, the device connected to the television through one of the at least one connections, recognizing activation of the device, and loading and running software in the television, responsive to the activation of the device. The software interfaces between the device and a processing element of the television.

In another embodiment, a television is disclosed including a system for detecting a connection of a device. The television includes a display panel and a processing element that is interfaced to the display panel. There is at least one connection to the television and each of the connections is interfaced to the processing element. A device is connected to the television through one of the at least one connections. Software running on the processing element is configured to recognize activation of the device and, responsive to the activation of the device, the software loads and runs a program that interfaces with the device.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
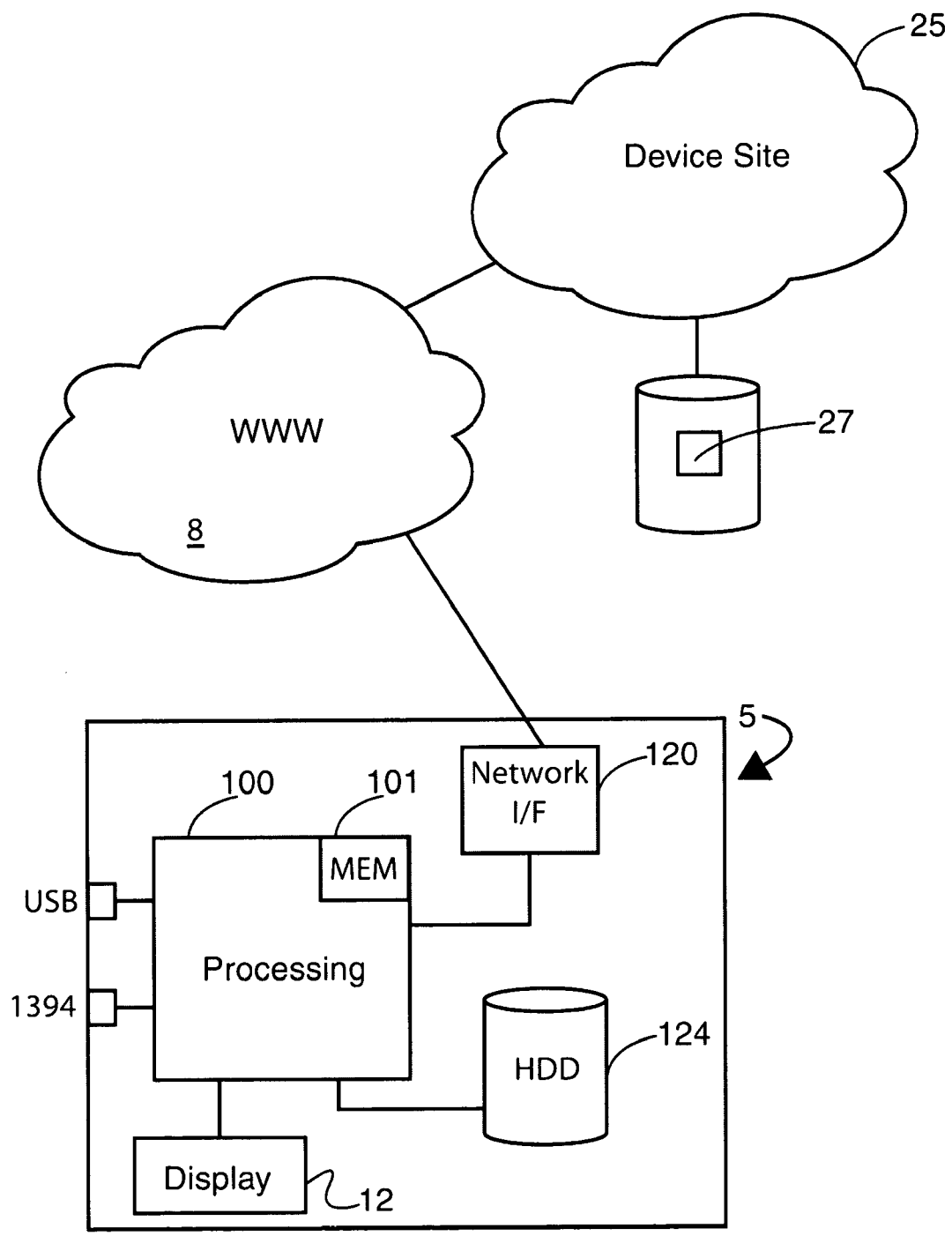
FIG. 1 illustrates a schematic view of a television connected to the Internet of the present invention.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a schematic view of a television 5 of the present invention will be described. A greatly simplified schematic of a television 5 is shown in FIG. 1. Many components are not shown for brevity and clarity reasons. A typical television 5 has some sort of processing element 100 such as a digital signal processor, controller, single-chip processor (e.g., 80C51) or even a more capable processor such as an x386 scale processor. There is a memory 101 associated with the processor for execution of programs, etc. The memory is any combination of dynamic memory, static memory, flash memory, read only memory, erasable read only memory, etc.

All televisions 5 will have some sort of display panel 12, for example, a liquid crystal display (LCD) panel, a Plasma panel, an array of light emitting diodes (LEDS), a CRT and an organic LED (OLED), etc.

In this example, the television 5 is a connected television 5, connected to the Internet 8 (or other network) through a network interface 120. Such network interfaces 120 include, but are not limited to, wired connections through Ethernet (e.g., 802.3), Universal Serial Bus (USB), Firewire, serial, parallel, HDMI; or through wireless connections through WiFi (802.11), Bluetooth, etc. Also, in this example, is a storage device 124 such as a hard disk drive (HDD), a flash memory, etc. In general, the storage device 124 is some type of persistent memory for storage of programs, parameters and content, etc. Content is, for example, movies (video), music, still images, audio books, video books, digital books and the like.

The processing element 100 has access to the Internet 8 through the network interface 120. Through this, the processing element can retrieve data, content and/or programs (e.g., programs specific to the device) from a plurality of web sites connected through the Internet. The data is, for example, stock quotes, weather, time, etc. The content is, for example, movies, books, television programs, web pages, music, other audio, etc. The programs are, for example, driver programs, applications, applets, java scripts, HTML, etc. Some web sites 25 have storage containing the program 27 (e.g., applet) for downloading and running on the television's 5 processing element 100.

Also connected to the processing element 100 are one or more input ports 1/2 such as a USB port 1 or a firewire (IEEE 1394) port 2. In some televisions 5, an input is provided through a wireless connection 3 such as Bluetooth, 802.11, Infrared, IRDA, and the like.

Figure 2:
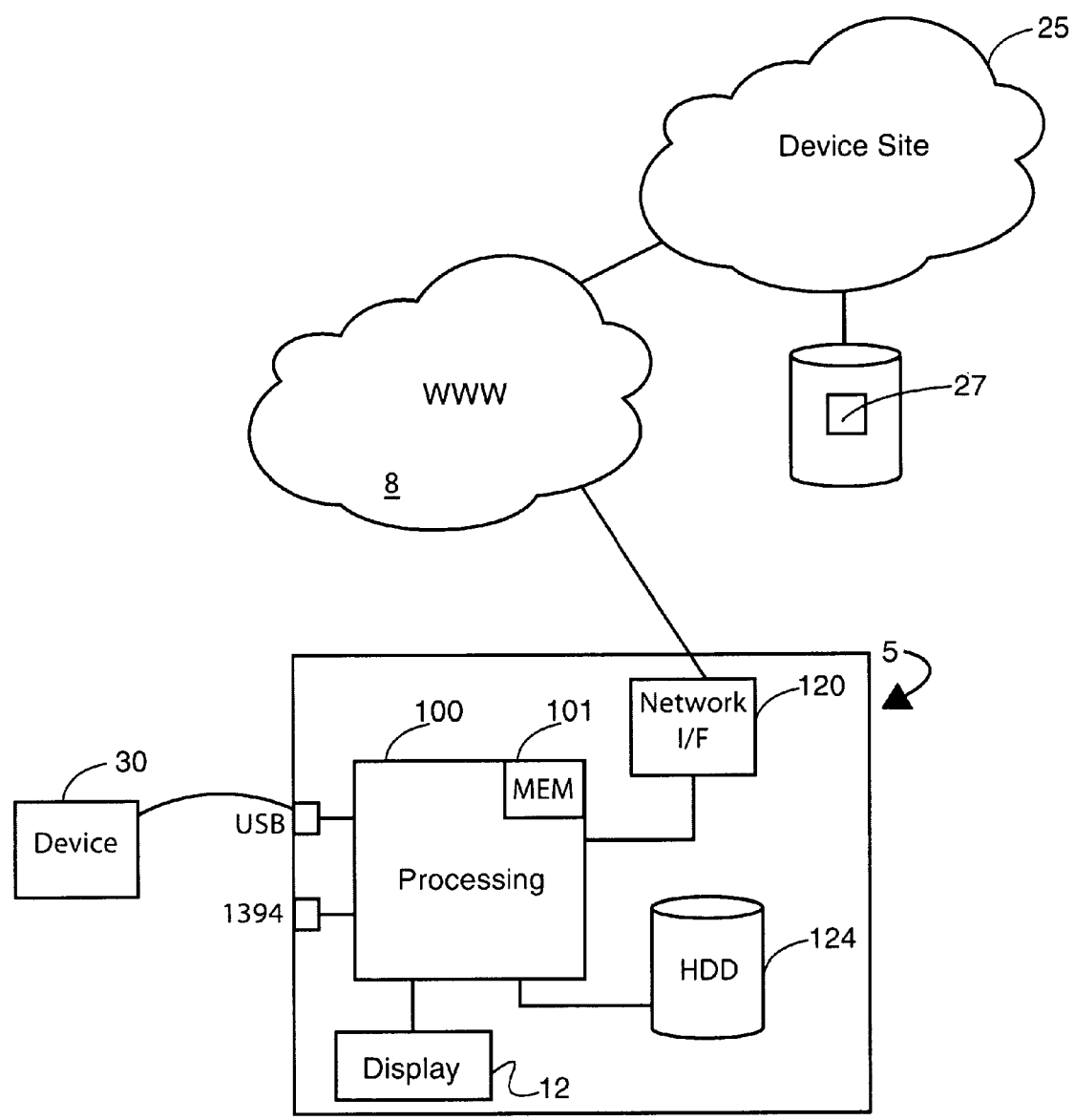
FIG. 2 illustrates a schematic view of a television connected to the Internet of the present invention with a connected device.

Referring to FIG. 2, a second plan view of a television 5 with a device connected will be described. In this simplified example, the device 30 is connected by the USB interface 1, although the device 30 is anticipated to be connected through any known interface including, but not limited to, USB, Firewire (IEEE 1394), IRDA, Infra Red, 802.11, Ethernet, Cardbus, Bluetooth, etc.

When a device 30 is detected by the television's 5 processing element 100, several actions are possible, depending upon the device 30.

In one example, a standard device 30 such as a device that appears as external storage is connected to the USB connector 1. In response, the processing element 100 locates and runs an internal program or applet. Examples of external storage devices 30 include, but are not limited to, external hard drives, jump drives and devices that appear as external drives such as music players and cameras. In this example, the processing element 100 recognizes that the device 30 is configured to be external memory and processes the device 30 as known internally, either as part of the processing element's 100 existing program or as an add-on such as an applet or java script 29 stored within local storage 124. Responsive to the detection of the device 30 that appears as an external drive, the processing element 100 provides the user options, preferably though an on-screen-display, to manage files stored on the external drive. For example, the existing program or applet or java script provides a navigatable file selection menu (e.g., like Windows Explorer). Such a menu provides a list of files and permits selection of one or more files for copying to the television's 5 storage device 124, execution (in the case of a program, applet, java script, etc.), open (in the case of a movie, song, image, etc.). For example, if one of the files on the device's 30 storage is a music file such as an MP3 file, and it is selected through the on-screen-display, the processing element 100 decodes the music file and plays it through the television's 5 amplifier 110 and speakers 112 (see FIG. 5).

In another example, the device 30 is a cellular phone 40 (see FIG. 4) and connects to the processing element 100 through a Bluetooth wireless connection through the wireless network adapter 122 when the cellular phone 40 is located within range of the television 5 and enabled (e.g., the cellular phone 40 is powered and Bluetooth is enabled). In this example, the processing element 100 does not understand how to interface with the cellular phone 40, so the processing element accesses information from the cellular phone 40 such as manufacturer, model, revision and any other identifying information available as known in the industry. The processing element 100 then uses this identification information to search the local storage 124 to see if device-specific software programs (drivers and/or applets for this cellular phone 40) are available locally. If found, the processing element 100 runs the device-specific software programs (e.g. drivers/applets) to interface with the cellular phone 40. For example the device-specific software programs (e.g. drivers/applets) provide an Internet connection from the cellular phone 40 through the Bluetooth connection to the television 5 over which, for example, an electronic program guide is downloaded. In another example, the device-specific software programs (e.g. drivers/applets) integrates the cellular phone 40 with the television 5 such that when a call is received by the cellular phone 40, the caller id information is displayed on the television 5 and, the call is answered through the remote control 111 (see FIG. 5) and the audio from the cellular phone 40 is routed to the processing element 100, then to the amplifier 110 and speakers 112, thereby providing a speakerphone capability. Likewise, voice captured by a microphone 109 (see FIG. 5) is routed to the processing element 100 and then to the cellular phone 40.

In another example, the device 30 is a printer 56 (see FIG. 4) and connects to the processing element 100 through a USB 1 connection. In this example, the processing element 100 does not understand how to interface with the printer 56, so the processing element accesses information from the printer 56 such as manufacturer, model, revision and any other identifying information available as known in the industry. The processing element 100 then uses this identification information to search the local storage 124 to see if device-specific software programs (e.g. drivers/applets) for this printer 56 are available locally. If device-specific software programs (e.g. drivers/applets) for this printer are found, processing element 100 runs the device-specific software programs (e.g. drivers/applets) to interface with the printer 56. If not found and an Internet 8 connection is available through the network interface 120, the processing element 100 finds a web site associated with the printers 56 identification information and downloads device-specific software programs (e.g. printer drivers) for the printer 56. As an example, the printer drivers enable print functions from the television 5 so, for example, a page from an electronic program guide (EFP) or a digital image is printable through the USB 1 interface to the printer 56.

Figure 3:
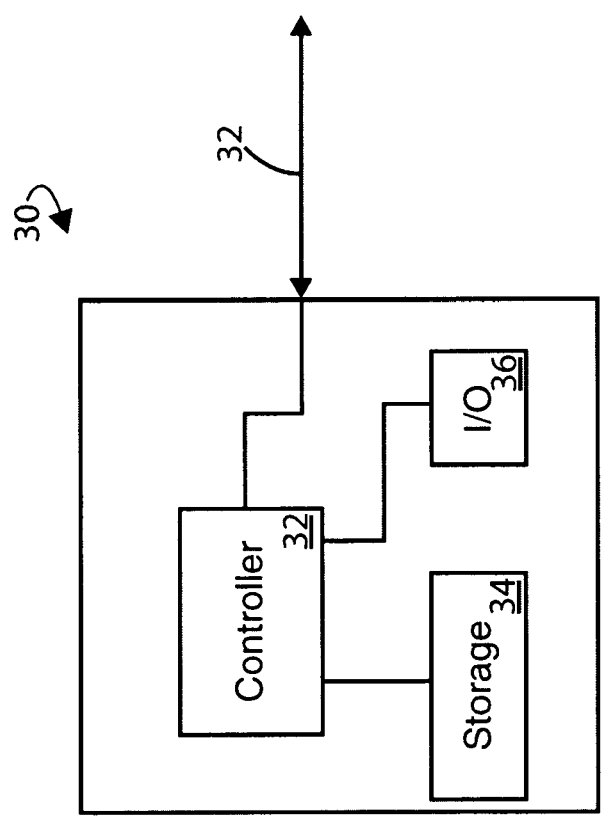
FIG. 3 illustrates a schematic view of the internal components of a typical device.

Referring to FIG. 3, a schematic view of a typical device 30 will be described. For the most part, devices 30 such as external memory devices, printers, cameras, etc., have several common or similar subsystems as shown in FIG. 3. Although many devices have other subsystems not shown (e.g., power suppliers, battery chargers, displays, keypads . . . ), these have been suppressed for brevity and clarity reasons.

In the simplified example of FIG. 3, the device 30 has a controller 32 (e.g., any processing device or devices, usually a digital signal processor or single chip computer) that connects to the television 5 through an interface cable 32. Internally to the device 30 is an I/O subsystem 36, for example, a display, keypad or buttons, an image sensor, a speaker or headphone jack, etc. Additionally, interfaced to the controller is typically some type of persistent storage 34 for storing video, audio, pictures, etc. Examples of the storage 34 are flash memory and hard disks.

Figure 4:
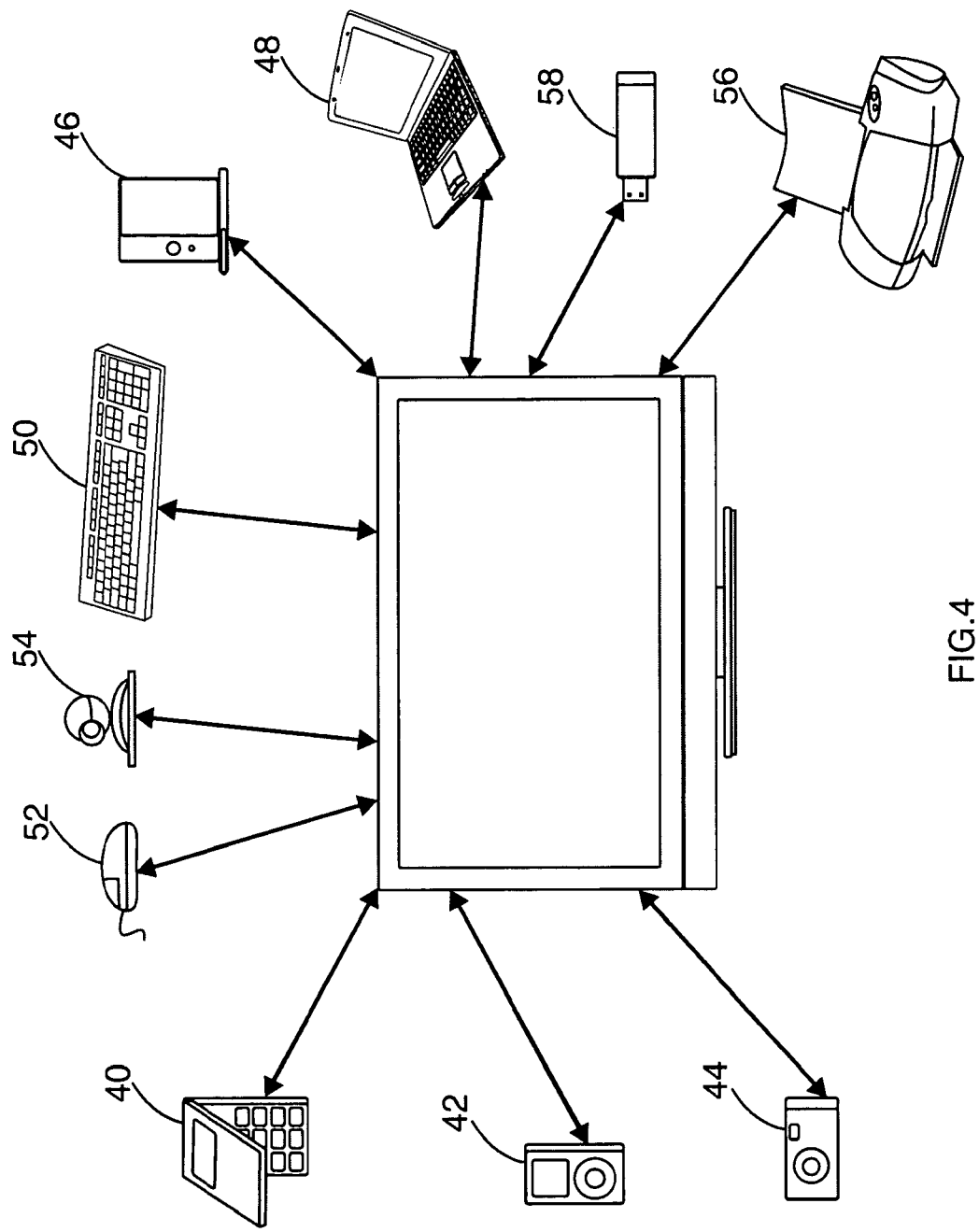
FIG. 4 illustrates a plan view of a television of the present invention with connections to a typical set of devices.

Referring to FIG. 4, a plan view of a television 5 with a range of devices that connect to the television 5 will be described. Although there are other devices 30 that will connect, interface and interoperate with the television 5, some of the more common devices 30 are shown. A cellular phone 40 interfaces with the television 5 to, for example, provide an Internet 8 connection and/or speaker phone capabilities, etc.

A cellular phone 40 interfaces with the television 5 to, for example, provide an Internet 8 connection and/or speaker phone capabilities, etc.

A cellular phone 40 interfaces with the television 5 to, for example, provide an Internet 8 connection and/or speaker phone capabilities, etc.

A music player 42 interfaces with the television 5 to, for example, provide an enhanced user interface as well as playback through the television's 5 speakers 112, etc.

A camera 44 interfaces with the television 5 to, for example, provide a large-screen view of images stored on the camera and to upload one or more of the images to the television's storage 124, etc.

An external hard drive 46 interfaces with the television 5 to, for example, provide storage for content as with a personal video recorder (PVR), etc.

A computer 48 interfaces with the television 5 to, for example, provide enhanced television 5 configuration, creation of patterns such as screen savers, etc.

A keyboard 50 interfaces with the television 5 to, for example, provide enhanced input capabilities, etc.

A mouse 52 interfaces with the television 5 to, for example, provide improved control, for example, when accessing the Internet 8, etc.

A camera 54 interfaces with the television 5 to, for example, provide video phone capabilities, etc.

A printer 56 interfaces with the television 5 to, for example, provide hard copy of data and/or content from the television 5, etc.

A jump drive 58 interfaces with the television 5 to, for example, provide a way to copy content from a remote computer (not shown) to the television 5, etc.

Figure 5:
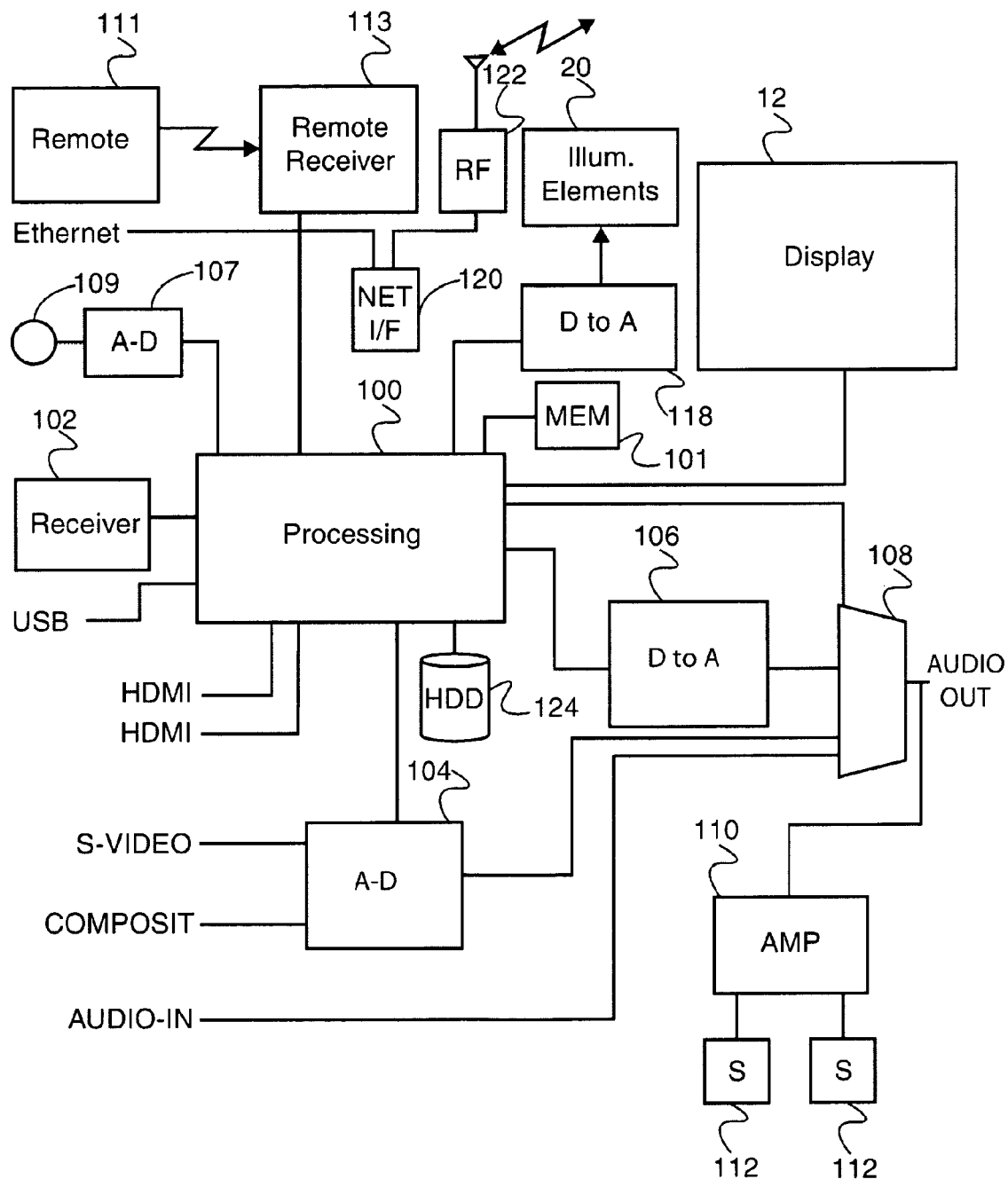
FIG. 5 illustrates a schematic view of a typical television of the present invention.

Referring to FIG. 5, a schematic view of a typical television of the present invention will be described. This figure is intended as a representative schematic of a typical television 5 and in practice, some elements are not present in some monitors/televisions 5 and/or additional elements are present in some monitors/televisions 5. In this example, a display panel 12 is connected to a processing element 100. The display panel 12 is representative of any known display panel including, but not limited to, LCD display panels, Plasma display panels, OLED display panels, LED display panels and cathode ray tubes (CRTs).

The processing element 100 accepts video inputs and audio inputs selectively from a variety of sources including an internal television broadcast receiver 102, High-definition Media Inputs (HDMI), USB ports 1 and an analog-to-digital converter 104. The analog-to-digital converter 104 accepts analog inputs from legacy video sources such as S-Video and Composite video and converts the analog video signal into a digital video signal before passing it to the processing element. The processing element controls the display of the video on the display panel 12.

Audio emanates from either the broadcast receiver 102, the legacy source (e.g., S-Video) or a discrete analog audio input (Audio-IN). If the audio source is digital, the processing element 100 routes the audio to a digital-to-analog converter 106 and then to an input of a multiplexer 108. The multiplexer 108, under control of the processing element 100, selects one of the audio sources and routes the selected audio to the audio output and an internal audio amplifier 110. The internal audio amplifier 110 amplifies the audio and delivers it to internal speakers 112/114.

The processing element 100 accepts commands from a remote control 111 through remote receiver 113. Although IR is often used to communicate commands from the remote control 111 to the remote receiver 113, any known wireless technology is anticipated for connecting the remote control 111 to the processing element 100 including, but not limited to, radio frequencies (e.g., Bluetooth), sound (e.g., ultrasonic) and other spectrums of light. Furthermore, it is anticipated that the wireless technology be either one way from the remote 111 to the receiver 113 or two way.

In some embodiments, a microphone 109 is interfaced to the processing element 100 through, for example, an analog to digital converter 107. This is but an example of interfacing a microphone 109 to the processing element 100 and other methods are known and included here within.

Figure 6:
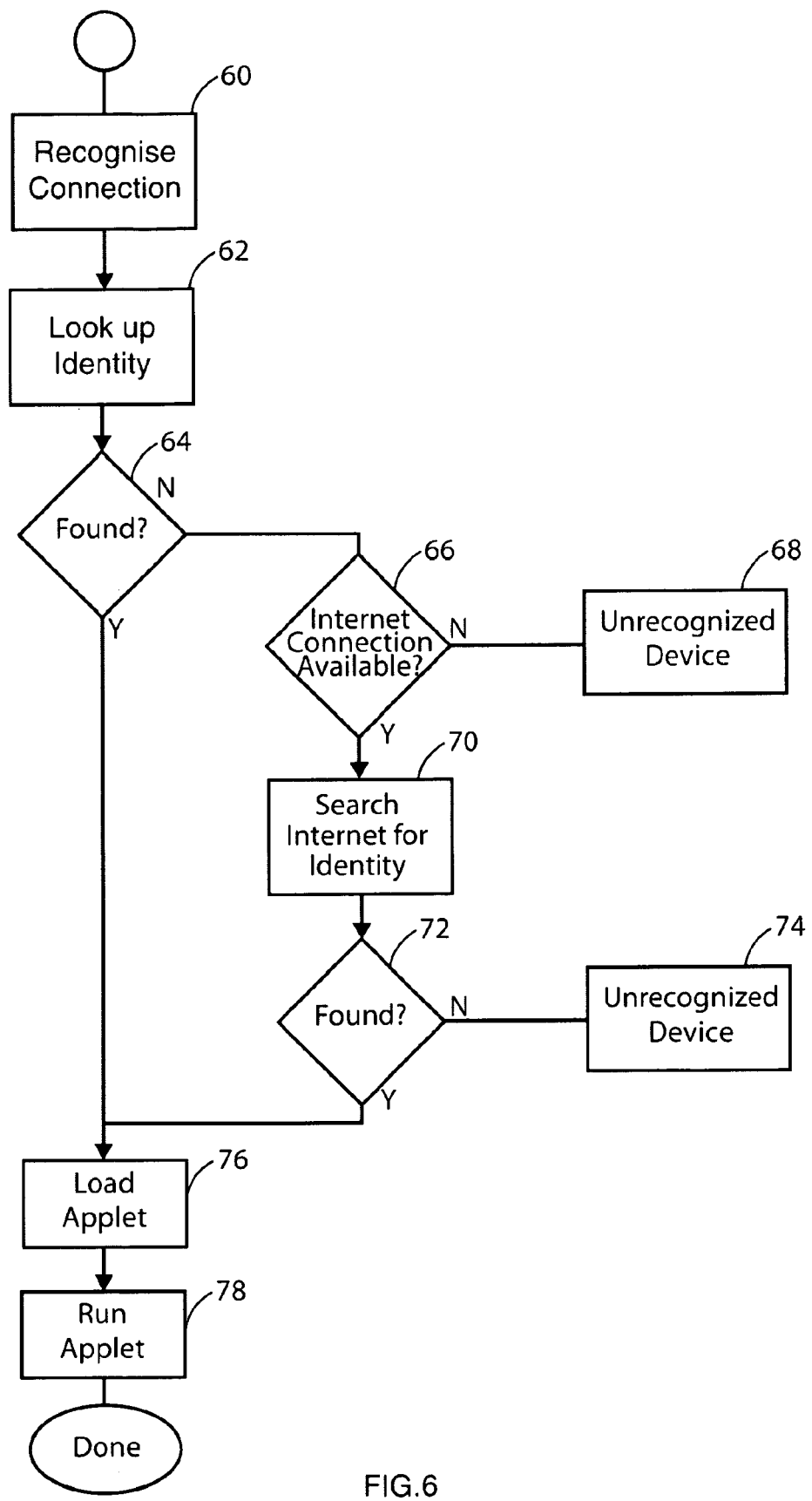
FIG. 6 illustrates a first flow chart of the present invention.

Referring to FIG. 6, a first flow chart of the present invention will be described. This is an exemplary program flow executed within the processing element 100 upon detection of a device 30 being connected 60 to any input (e.g., USB input port 1). Information such as manufacturer, model number, type of device, home web site, serial number, etc., is retrieved 31 from the device 30 and the information is looked up 62 locally (e.g. in storage 124). If there is no match to the information locally, then it is determined if there is an active internet connection 66. If not, then the device cannot be recognized 68 and an error message and/or tone is emitted. If there is an active internet connection 66, then the Internet 8 is searched 70 for the identification information (e.g., at the device web site 25). If the identification information is not found 72 on the Internet 8, the support for the device 30 cannot be found and an error message and/or tone is emitted.

If identification information is found locally 62 or found 70 on the Internet 8, an applet, program, java script, driver, etc., is loaded from the local storage 124 or from a storage area 27 at the device web site 25. In some embodiments, the applet, program, java script, driver, etc., is stored on the local storage 124 for faster response the next time the same device 30 is connected to the television 5. The loaded applet, program, java script, driver, etc., is then run by the processing element 100 to provide the desired services from the device 30.

Figure 7:
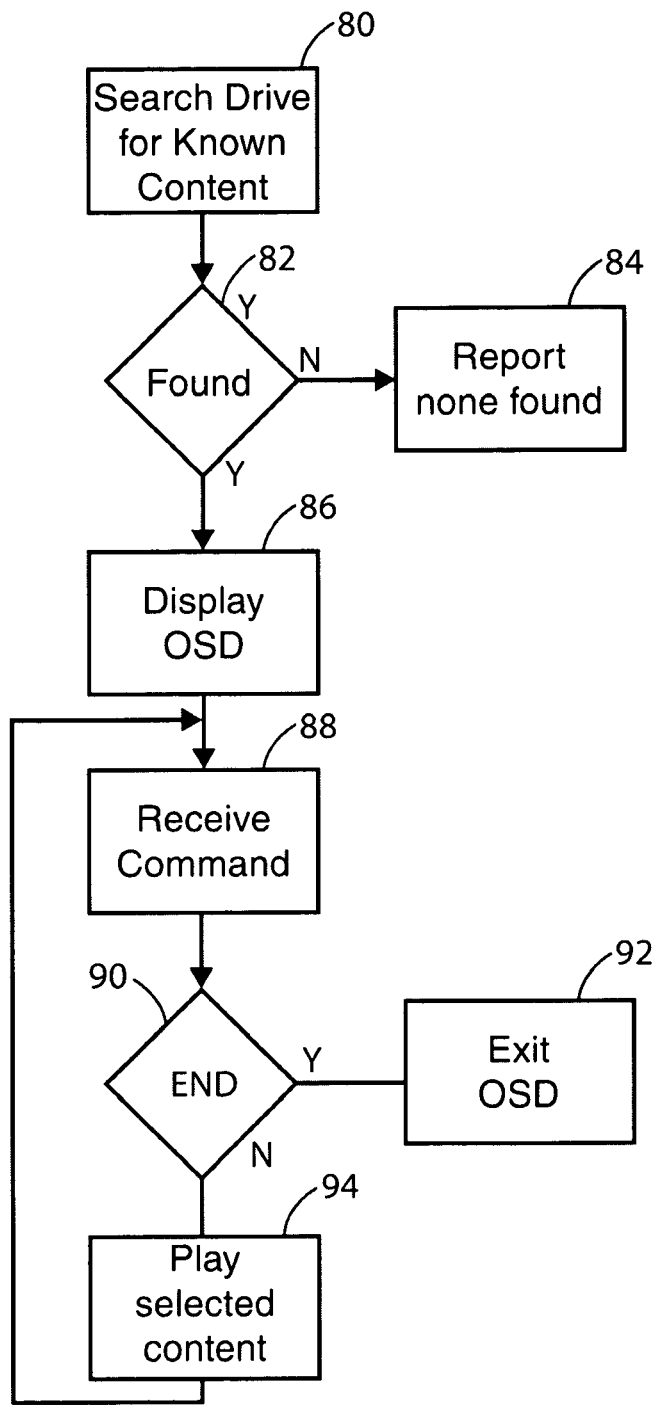
FIG. 7 illustrates a first second chart of the present invention.

Referring to FIG. 7, a second chart of the present invention will be described. This is an exemplary program flow executed within the processing element 100 when a device 30 that is identified as an external storage device or external hard drive is connected 80. In this, since it is a storage device, the storage device is searched to find supported content such as movies, music, still pictures, spreadsheets, documents, etc. If no content if found 82, status is presented 84 to the user on the television 5. If content if found 82, some or all of the content is displayed in an on-screen display 86 (see FIG. 8) and the system waits for a command and when received 88, if it is an end command 90 (e.g., done with content on the device 30), the on-screen display is exited 92. Otherwise, the selected content is played (e.g., music played, movie played, image displayed, spreadsheet displayed, Powerpoint presentation started, etc.). Once the selected content is done being played, the flow continues with receiving a next command 88.

Figure 8:
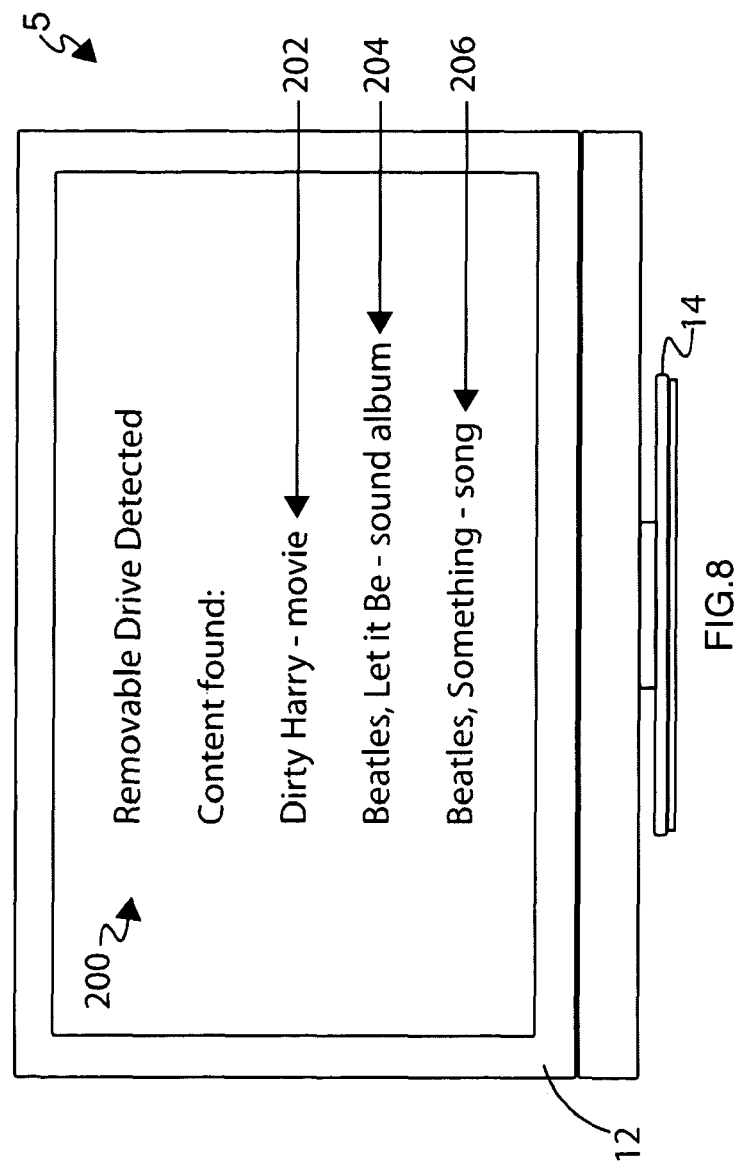
FIG. 8 illustrates a plan view of a first typical on-screen display of the present invention.

Referring to FIG. 8, a plan view of a typical on-screen display of the present invention will be described. Many user interfaces are known in the industry and the option selection user interface of FIG. 8 is but one example. In this example, the user is presented with the heading "Removable Drive Detected" 200 along with a list of possible selections 202/204/206. In the list of possible selections 202/204/206 are "Dirty Harry—movie" 202, "Beatles, Let it Be—sound album" 204 (similar to FIG. 3) and "Beatles, Something—song" 206. This is a greatly simplified version of such an on-screen display 200 and such an on-screen display typically contains navigation bars, hierarchies, folders, etc. In this simplified example, if the user selects one of the list of possible selections 202/204/206, the selected content is decoded by the processing element 100 (or other component of the television 5) and the content is delivered to the display panel 12 and/or the amplifier 110 and speakers 112.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A video system comprising:
    a video device having a processing element, an output for a display of video information obtained by the video device, the processing element interfaced to the output to the display; at least one connection to the video device, the at least one connection interfaced to the processing element; and
    a non-transitory medium storing software, said software running on the processing element, wherein said software detects both a wireless connection and a wired connection, wherein said software is operative upon detecting the wired connection to recognize a mass storage device and to run an operation that automatically looks for supported content on the mass storage device that can be output to the display, and to output information about said supported content on the output to the display, where said information includes information indicative of the content and information indicative of whether the content is a movie, music, still pictures, or a document from each of said items of content,
    and said software is operative upon detecting the wireless connection to recognize automatically a wireless communicating device which enables wireless telephone calls and where said wireless communicating device is different than said mass storage device, said software recognizing via a wireless connection, when the wireless communicating device is located within range of the video device and enabled, and the software is operative to determine device specific information about the specific wireless communicating device including at least a manufacturer and part number of the specific wireless communicating device, and to determine if a driver has been previously stored for the specific wireless communicating device, and if not to obtain at least a device specific driver by downloading a device specific driver over the Internet, and storing said device specific driver for faster response the next time that the same device is connected, to integrate the wireless communicating device with the video device that is based on said manufacture and part number of the specific wireless communicating device and thereafter to communicate with the wireless communicating device after obtaining said device specific information and using said driver, wherein the software is also operative to interface with a remote control which controls a video device operation including at least including changing items that are played on the video device, said remote control being operable to answer calls on the wireless communicating device after obtaining said device specific information from said wireless communicating device.

2. The system of claim 1, wherein the video device is a television with an internal screen.

3. The system of claim 1, wherein the video device receives an internet connection via the wireless communicating device.

4. The system of claim 3, wherein the video device receives information wirelessly about an electronic program guide for programs to be played using the video device, from the wireless communicating device.

5. The system of claim 1, wherein the wireless communicating device is a cellular phone.

6. The system of claim 1, wherein the video device stores plural different drivers and also device specific software programs for interfacing with the wireless communicating device.

7. A method of communicating on a video device, the method comprising: using the video device for an output for a display of video information obtained by the video device;
    from the video device, detecting a device that is remote from the video device over a connection; the video device operating for detecting both a wireless connection and a wired connection, at a first time, recognizing a mass storage device that is connected via said wired connection to said video device and running an operation that automatically looks for supported content on the mass storage device that can be output to the display, and to output information about said supported content on the output to the display, where said information includes information indicative of the content and information indicative of whether the content is a movie, music, still pictures, or a document for each of said items of content,
    at a second time, recognizing automatically a wireless communicating device which is connected via said wireless connection and where said wireless communicating device is different than said mass storage device and which enables wireless telephone calls, said recognizing being via a wireless connection, and determining device specific information about the specific wireless communicating device, and to obtain a manufacturer and part number of the specific wireless communicating device to determine if a driver has been previously stored for the specific wireless communicating device, and if not to obtain at least a device specific driver by downloading such a driver over the Internet, and storing said device specific driver for faster response the next time that the same device is connected to integrate the wireless communicating device with the video device and thereafter to communicate with the wireless communicating device after obtaining said device specific information that is based on said manufacturer and part number of the specific wireless communicating device,
    wherein the software is also operative to interface with a remote control which controls a video device operation including at least including changing items that are played on the video device, said remote control being operable to answer calls on the wireless communicating device after obtaining said device specific information from said wireless communicating device.

8. The method of claim 7, wherein the video device is a television with an internal screen.

9. The method of claim 7, wherein the video device receives an internet connection via the wireless communicating device.

10. The method of claim 7, wherein the wireless communicating device is a cellular phone.

11. The method of claim 9, wherein the video device receives information wirelessly about an electronic program guide for programs to be played using the video device, from the wireless communicating device.

12. The method of claim 7, wherein the video device stores plural different drivers and also device specific software programs for interfacing with the wireless communicating device.

13. A video system comprising:
a video device having a processing element, and an output for a display of video information obtained by the video device, the processing element interfaced to the output to the display;
at least one connection to the video device, the at least one connection interfaced to the processing element; and
said video device detecting both a wireless connection and a wired connection, recognizing a mass storage device upon detecting said wired connection and to run an operation that automatically looks for supported content on the mass storage device that can be output to the display, and to output information that lists said supported content on the output to the display, where said information includes information indicative of the content and information indicative of whether the content is a movie, music, still pictures, or a document for each of said items of content,
said video device automatically recognizing a wireless communicating device over said wireless connection, which is different than said mass storage device and which enables carrying out wireless telephone calls and has an internet connection, said recognizing being via a wireless connection when the wireless communicating device is located within range of the video device, wherein the video device is also operative to interface with a remote control which controls a video device operation including at least changing items that are seen on the video device,
said video device receives information from an internet connection via the internet connection of the wireless communication device, wherein said video device is operative to determine device specific information about the specific wireless communication device, and to determine if a driver has been previously stored for the specific wireless communicating device, and if not to obtain at least a device specific driver by downloading the device specific driver over the Internet, and storing said device specific driver for faster response the next time that the same device is connected.

14. The system as in claim 13, wherein said video device is operative to integrate the wireless communicating device with the video device and thereafter to communicate with the wireless communicating device after obtaining said device specific information.

15. The system as in claim 14, said remote control being operable to answer calls on the wireless communicating device after obtaining said device specific information from said wireless communicating device.

16. The system of claim 14, wherein the video device is a television with an internal screen.

17. The system of claim 13, wherein the wireless communicating device is a cellular phone.

18. The system of claim 14, wherein the video device receives information wirelessly about an electronic program guide for programs to be played using the video device, from the wireless communicating device.

19. The system of claim 14, wherein the video device stores both plural different drivers and device specific software programs for interfacing with different wireless communicating devices.

20. A method of operating a video system comprising:
using a video device for creating an output for a display of video information obtained by the video device based on commands from a user received from a remote control device, including changing items that are played on the video device;
using a processor in said video device for detecting both a wireless connection and a wired connection, recognizing a mass storage device via said wired connection and running an operation that automatically looks for supported content on the mass storage device that can be output to the display, and to display a user interface showing said supported content on the output to the display, where said user interface includes information indicative of the content and information indicative of whether the content is a movie, music, still pictures, or a document for each of said items of content,
automatically recognizing a wireless communicating device different from the mass storage device over said wireless connection, which enables carrying out wireless telephone calls and has an internet connection, said recognizing being via a wireless connection when the wireless communicating device is located within range of the video device said video device receives information from an internet connection via the internet connection of the wireless communicating device and, determine device specific information about the specific wireless communicating device, and to determine if a driver has been previously stored for the specific wireless communicating device, and if not to obtain at least a device specific driver by downloading the device specific driver over the Internet, and storing said device specific driver for faster response the next time that the same device is connected.

21. The method as in claim 20, further comprising integrating the wireless communicating device with the video device and thereafter to communicate with the wireless communicating device after obtaining said device specific information.

22. The method as in claim 20, said remote control being operable to answer calls on the wireless communicating device after obtaining said device specific information from said wireless communicating device.

23. The method of claim 21, wherein the video device is a television with an internal screen.

24. The method of claim 20, wherein the wireless communicating device is a cellular phone.

25. The method of claim 20, wherein the video device receives information wirelessly about an electronic program guide for programs to be played using the video device, from the wireless communicating device.

26. The method of claim 20, wherein the video device stores plural different drivers and device specific software programs for interfacing with different wireless communicating devices.

* * * * *